R. FAY.
SWITCH.
APPLICATION FILED MAY 5, 1911.

1,120,465. Patented Dec. 8, 1914.
7 SHEETS—SHEET 1.

Witnesses
Inventor
Robert Fay
By Wm C. W. McIntire
Attorney

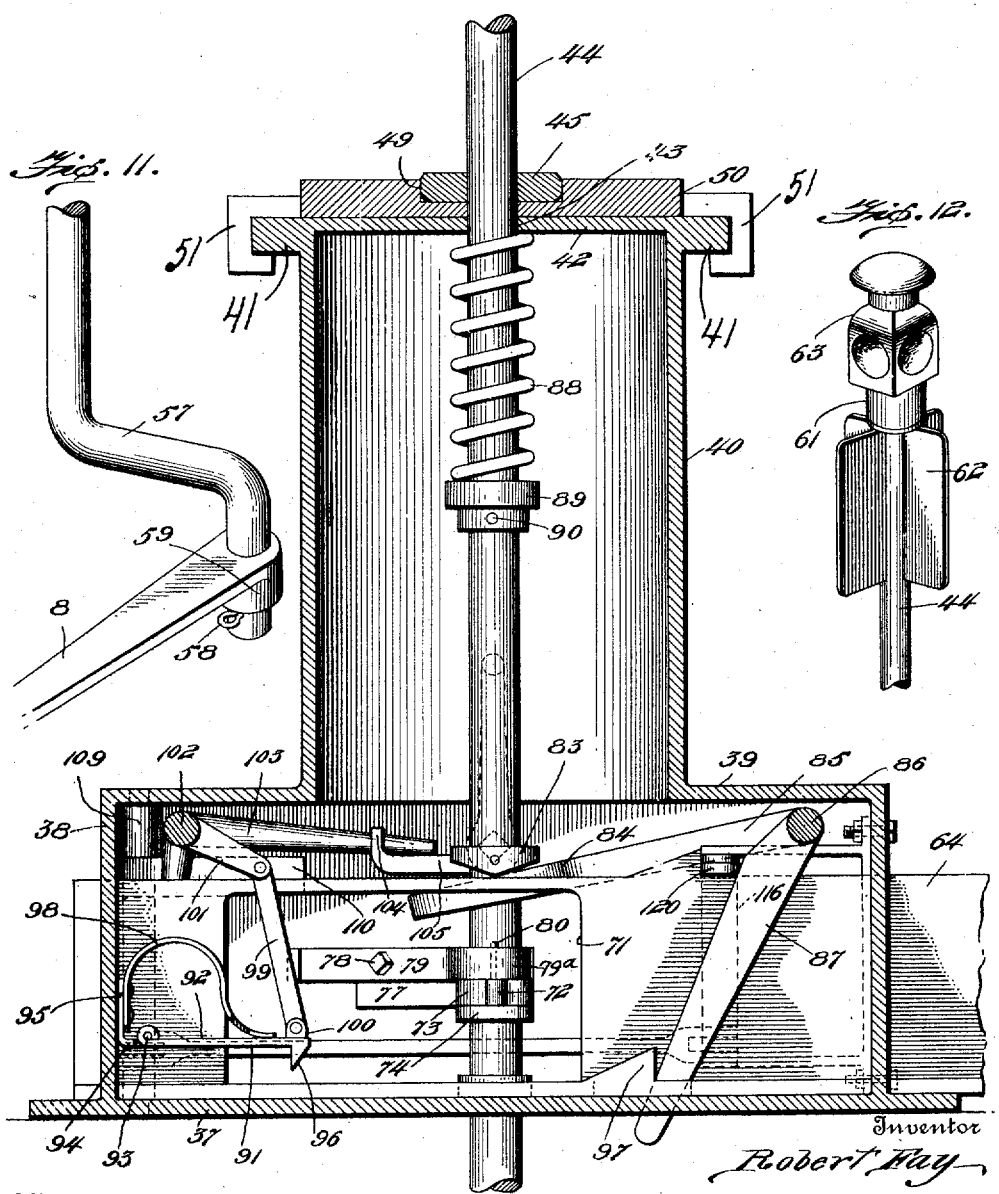

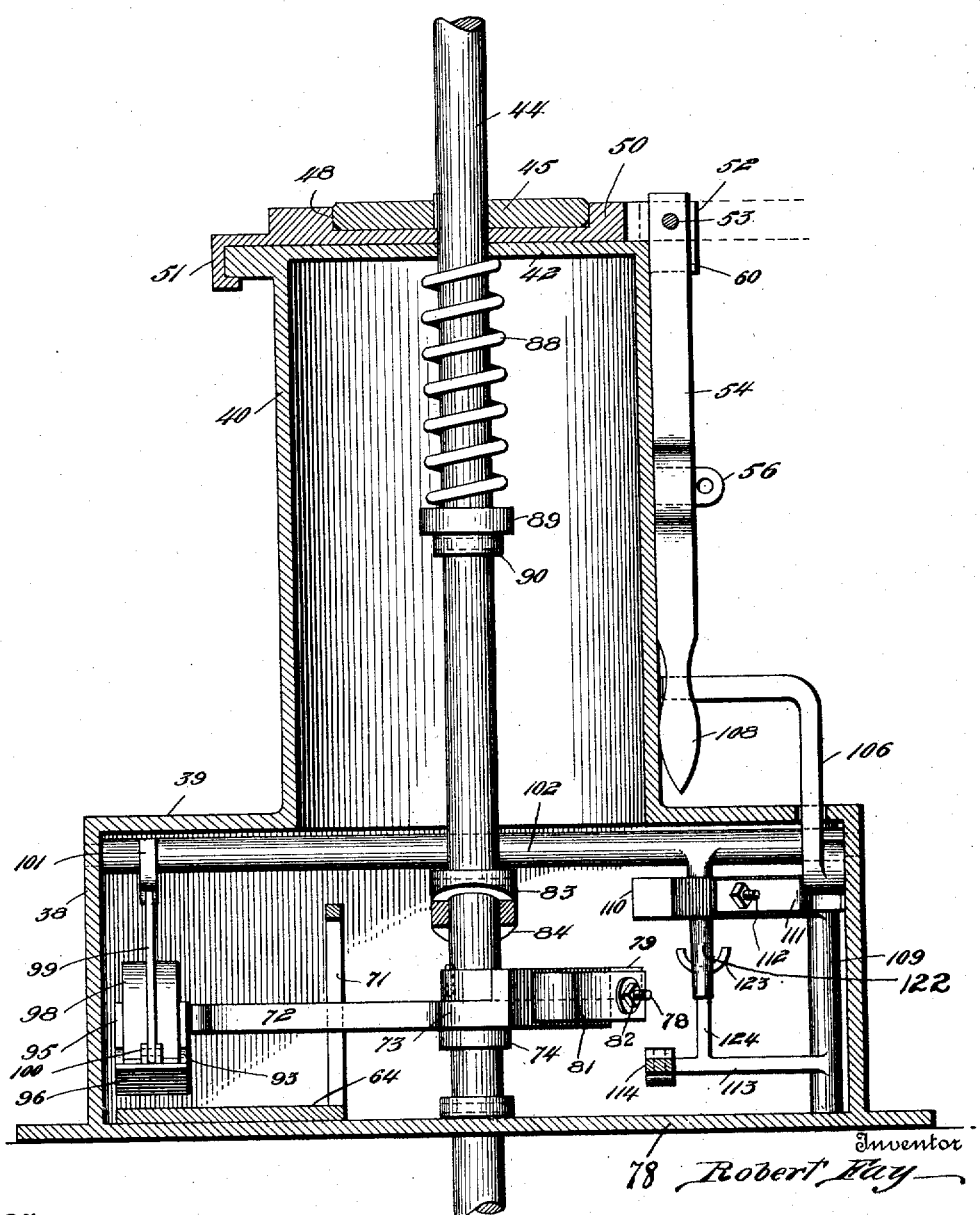

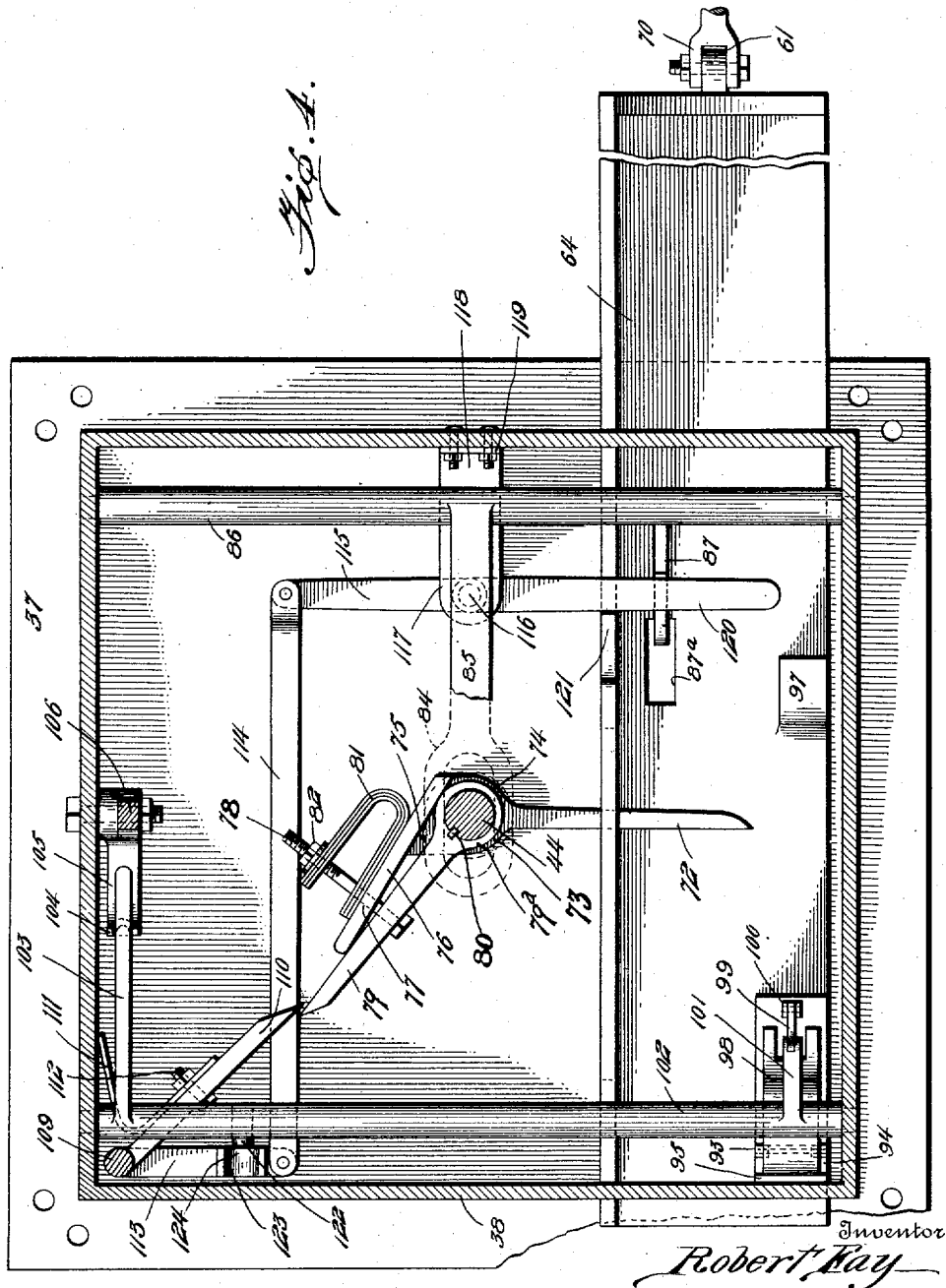

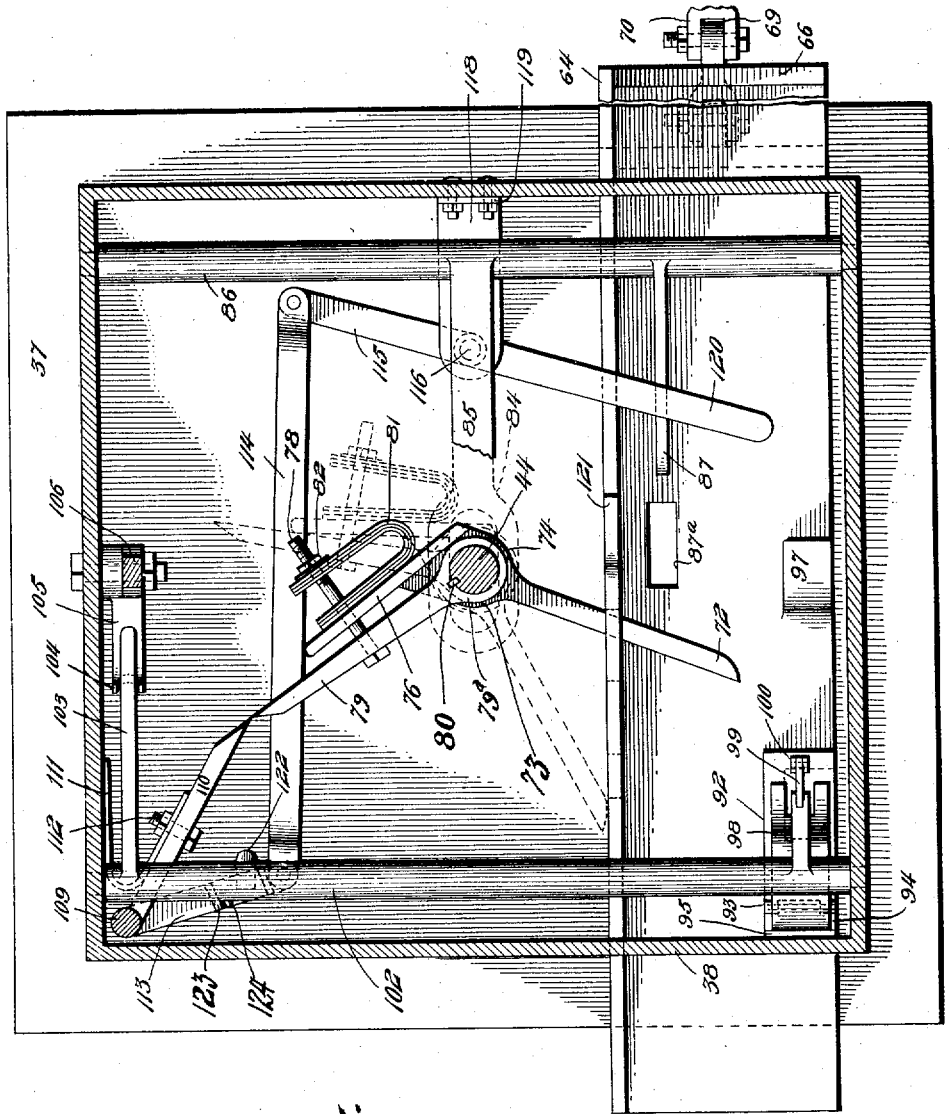

R. FAY.
SWITCH.
APPLICATION FILED MAY 5, 1911.
1,120,465.
Patented Dec. 8, 1914.
7 SHEETS—SHEET 6.
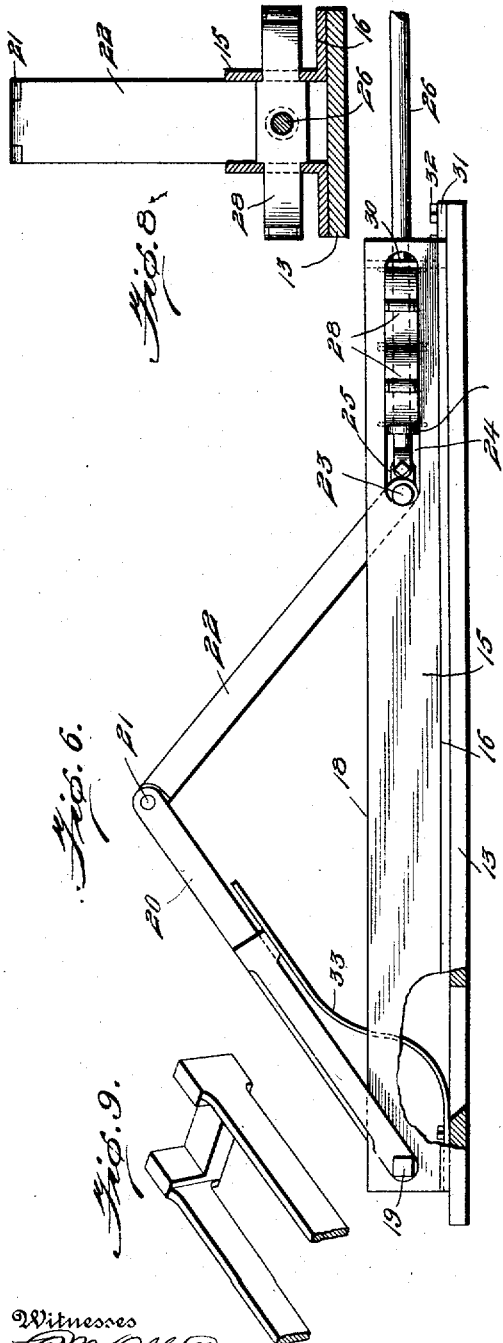
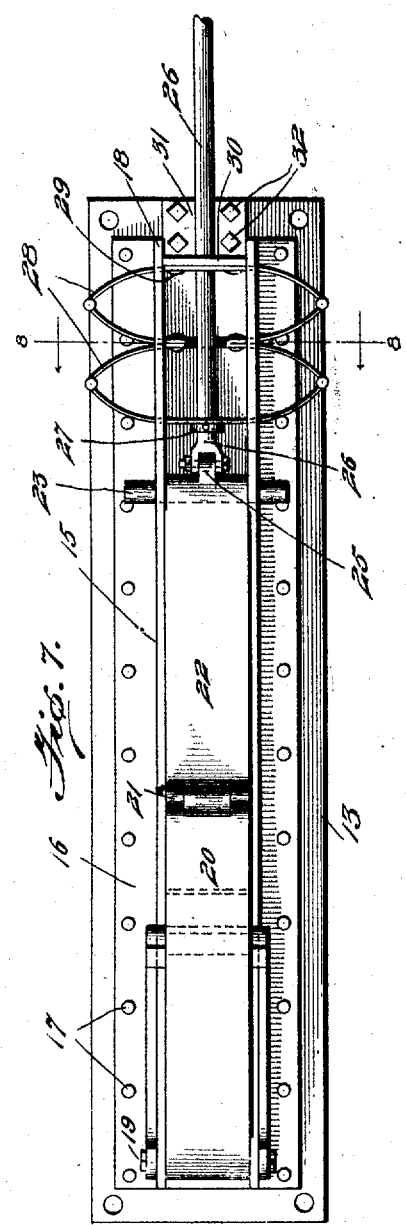
Witnesses
Inventor
Robert Fay
By Wm C R McIntire
Attorney

R. FAY.
SWITCH.
APPLICATION FILED MAY 5, 1911.

1,120,465.

Patented Dec. 8, 1914.
7 SHEETS—SHEET 7.

Witnesses
Inventor
Robert Fay
By Wm C McIntire
Attorney

UNITED STATES PATENT OFFICE.

ROBERT FAY, OF MURPHYSBORO, ILLINOIS.

SWITCH.

1,120,465.  Specification of Letters Patent.  Patented Dec. 8, 1914.

Application filed May 5, 1911. Serial No. 625,270.

*To all whom it may concern:*

Be it known that I, ROBERT FAY, a citizen of the United States, residing at Murphysboro, in the county of Jackson and State of Illinois, have invented certain new and useful Improvements in Switches; and I do hereby declare the following to be a full, clear, and exact description of the invention, such as will enable others skilled in the art to which it appertains to make and use the same.

This invention relates to new and useful improvements in switches, and more particularly to that class most generally known under the title of combination automatic and hand operated switches.

An object of this invention is the provision of a switch of this character, which comprises suitable mechanism for the purpose of operating the same by means carried upon an approaching train, and also for the purpose of locking the switch in an open position.

Another object of this invention is the provision of a railway switch which may be manually operated for the purpose of opening and closing the same independently of the automatic train-operated means.

A further object of this invention is the provision of a switch of this character, which is adapted to be operated by an approaching train, the said switch being so constructed that in the event of the engagement of any undesired object between the rail points which will serve to prevent the same from closing it will be returned to its original position, at which point it will be locked against displacement.

A still further object of this invention is to improve and simplify devices of this character, rendering them comparatively simple and inexpensive to manufacture, reliable and efficient in use, and readily operated.

With the above and other objects in view, this invention resides in the novel features of construction, formations, combinations and arrangements of parts to be hereinafter more fully described, claimed and illustrated in the accompanying drawings, in which—

Figure 1:
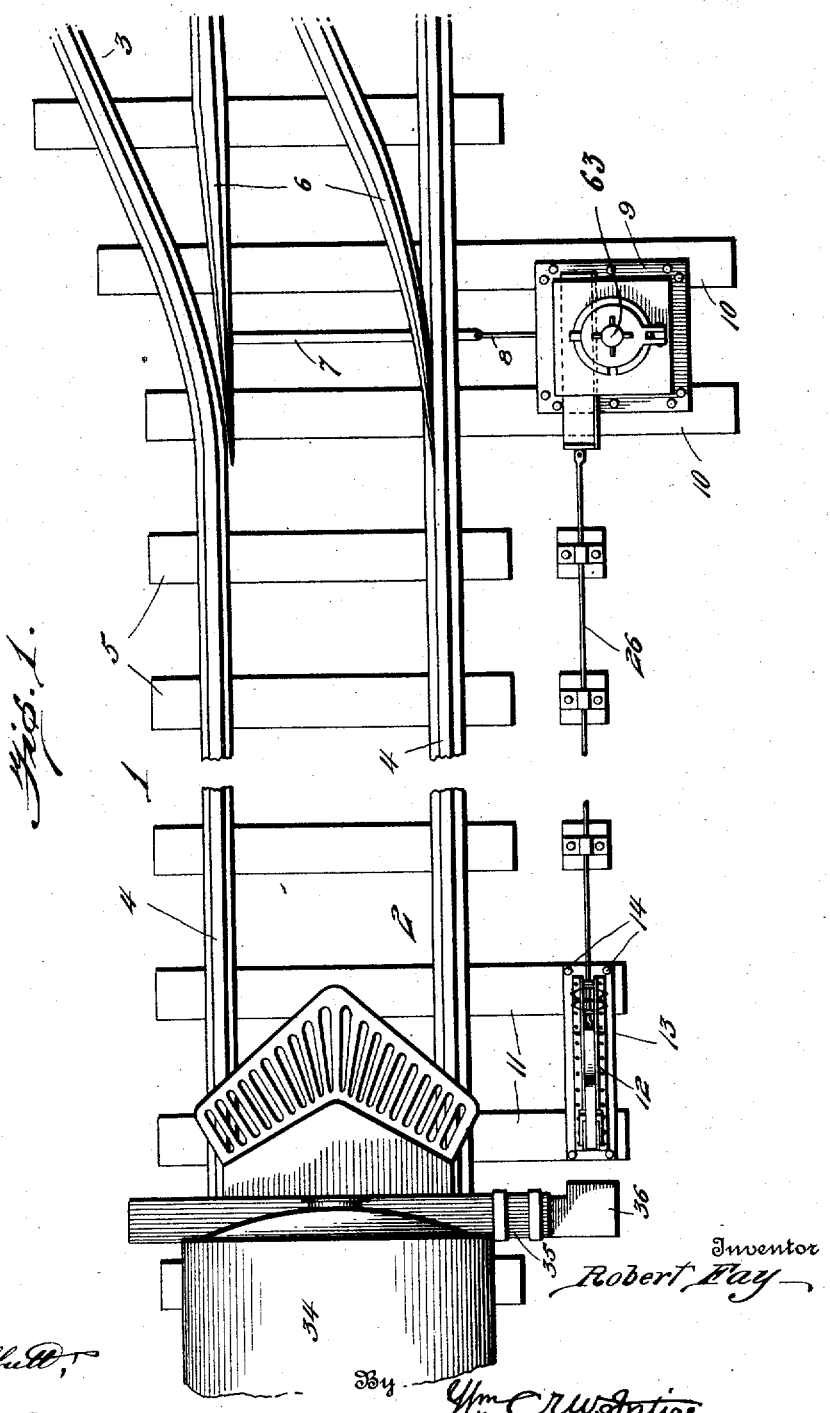
Figure 10:
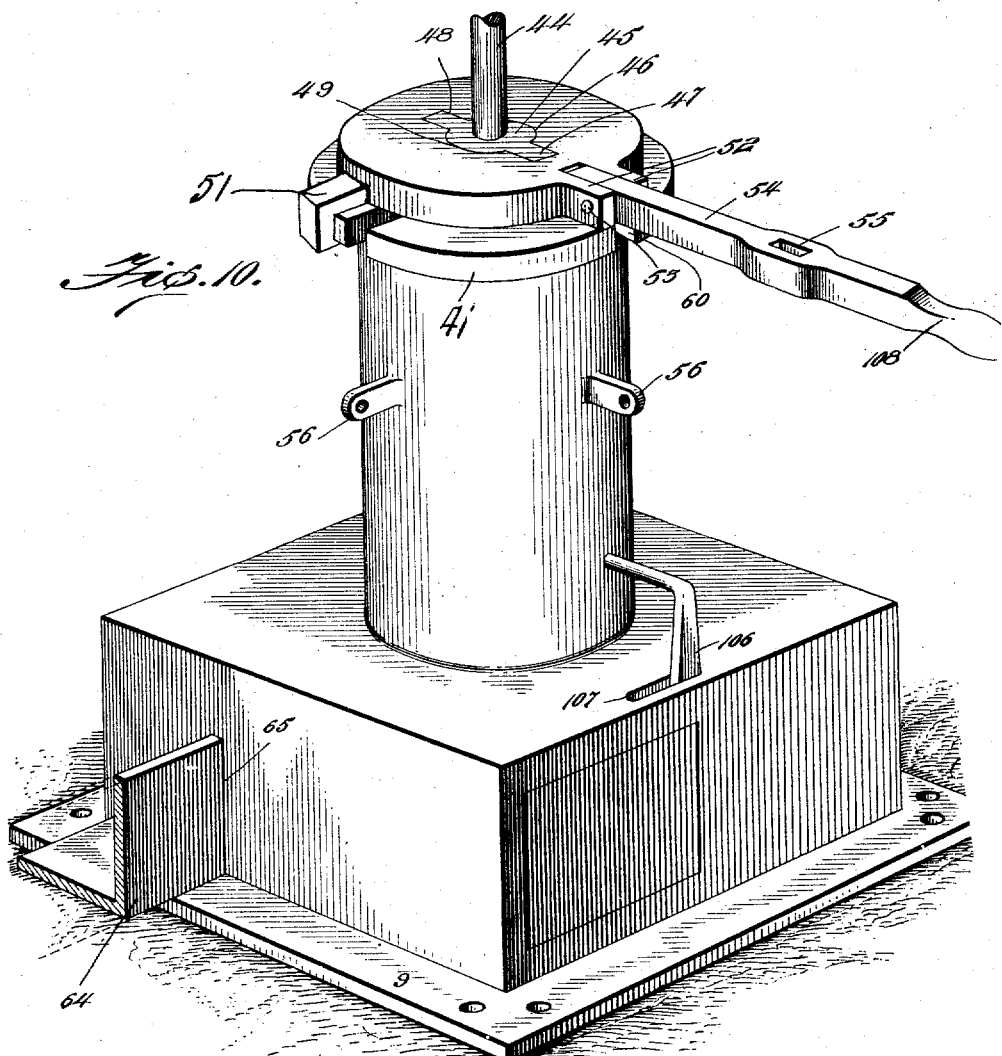

Figure 1 is a plan view of a portion of a railway track having my invention applied thereto; Fig. 2 is a vertical, longitudinal sectional view through the switch stand; Fig. 3 is a view similar to Fig. 2, but taken at right angles thereto; Fig. 4 is a horizontal sectional view taken through the switch stand, showing the various parts in one of their positions: namely, before the switch is thrown; Fig. 5 is a view similar to Fig. 4, showing the parts in their positions after the switch has been thrown; Fig. 6 is a side elevation of the trip mechanism; Fig. 7 is a plan view thereof; Fig. 8 is a transverse sectional view therethrough; Fig. 9 is a detail perspective illustrating the side bars; Fig. 10 is a detail perspective view of the switch stand, the hand lever being shown in raised position; Fig. 11 is a detail perspective view of the crank arm and link connected thereto; and Fig. 12 is a detail view of the upper end of the vertical shaft and signal carried thereby.

Referring to the drawings by characters of reference, the numeral 1 designates generally a railroad track of the usual construction, which consists of a main line 2 and a siding 3. The rails 4 in the main line and the siding are mounted upon the customary ties 5, and connected through the medium of switch points 6 of any customary type. These switch points 6 are connected at their free ends by a rod 7, which is connected at one end to a link 8 extending from the switch stand 9, supported upon the extended ends 10 of the ties 5.

The ends of several of the ties are extended a distance from the switch stand, as indicated by the numeral 11, to provide a support for the trip mechanism 12. This trip mechanism 12 is carried by a longitudinally extending horizontally disposed plate 13, secured to the ties by bolts 14, or any other suitable fastening means, the said plate having secured to its upper face angle bars 15, the horizontal flanges 16 of which are riveted, or otherwise secured, as at 17, to the said plate 13, while the upward or vertically extending flanges 18 of which have pivoted to their rear ends, as indicated by the numeral 19, an upwardly slanting operating member 20. This operating member 20 has hinged to its free end, as indicated by the numeral 21, a downwardly slanting member 22, which is provided at its lower extremity with a pair of oppositely extending trunnions 23, which project through slots 24 formed in the forward ends of the flanges 18. An apertured ear 25 is formed upon the downward terminal of the operating member 22, and is connected by means of a bolt to an operating rod 26.

A collar 27 is held adjustable upon the link 8 by any desired means, and engages one face of a pair of springs 28, the outer face of one of which is bolted, or otherwise rigidly secured, as indicated by the numeral 29, to a transversely extending upwardly projecting plate 30 formed upon the inner ends of a horizontally disposed plate 31, which is bolted, or otherwise secured, as indicated by the numeral 32, to the intermediate portion of the forward end of the plate 13. A leaf spring 33 is secured to the rear end of the plate 13 in any desired manner, and engages the under face of the operating member 20, for the purpose of yieldingly forcing the same to its uppermost position.

The numeral 34 designates generally a portion of an engine, which carries upon its front truck a downwardly extending arm 35, provided with an enlarged head 36, which is adapted to engage the operating member 20, for the purpose of forcing the rod 26 longitudinally with respect to the track and operating the mechanism contained within the stand.

The switch stand 9 comprises a base plate 37, which is bolted, riveted, or otherwise secured to the extensions 10 of the ties, preventing any undesired displacement therefrom upon the operation of the mechanism contained therein. A rectangular housing 38 extends upward from the base plate 37, and is provided at its upper edges with a horizontal flange 39, from which projects a cylindrical casing 40, provided at its upper end with an annular flange 41, and being partially closed by a horizontally disposed plate 42, which is provided with a concentric opening 43, through which extends a vertically disposed operating shaft 44. The shaft 44 has keyed thereto, adjacent the upper end of the casing 40, a locking plate 45, which consists of a cylindrical body portion 46, from which project extensions 47, adapted to be seated within the oppositely offset sides 48 of a circular seat 49 formed in the upper face of a revolving plate 50 mounted upon the shaft 44 and resting upon the flange 42, being held thereon against displacement by integral fingers 51, which project radially from the said plate 50 and extend under the annular flange 41.

One side of the plate 50 has formed thereon a pair of ears 52, between which are pivoted, as indicated by the numeral 53, a hand operating lever 54. This lever 54 is provided at a point intermediate its ends with a socket 55, adapted to receive one of a pair of lugs 56 projecting outwardly from the casing 40, to which the lever may be secured to hold the same against displacement by means of a padlock, or other suitable fastening device, not shown in the drawings. The lower extremity of the shaft 44 is provided with a crank arm 57, to the lower end of which is secured, by means of a cotter pin 58 or the like, the apertured end 59 of the link 8. Obviously when the lever 54 has been released from the lugs 56, the same may be swung upward and the plate 45 revolved, rotating the shaft 44 through the medium of the beforementioned means, for the purpose of throwing the switch points into and out of engagement with the rails. In order to permit the lever 54 to be moved downward into engagement with the lugs 56, the flange 41 is notched, as at 60, which, other than permitting the lever 54 to be moved downward to a vertical position, also serves to lock the plate 45 against rotation.

A suitable signaling device 61 is secured to the upper end of the shaft 44, and consists of a series of radially extending blades 62, of the usual design, above which is mounted a lantern 63, which serves to give the desired signal after dark. An operating slide 64 is longitudinally movable through the slots 65 formed in either end of the rectangular housing 38. This slide 64 is substantially L-shaped in cross section, being connected at one end by means of a triangular plate 66, from the center of which extends a lug 69, to which is connected the bifurcated end 70 of the operating rod 26. The vertical flange of the slide 64 is slotted, as indicated by the numeral 71, to permit the passage therethrough of an arm 72, which extends outwardly from the sleeve 73 secured to the shaft 44, being held thereon against any undesired vertical displacement by a collar 74, upon which the sleeve 73 rests. The side of the collar opposite the one from which the arm 72 extends is offset, as indicated by the numeral 75, and provided with an arm 76, in the end of which is formed a slot 77, through which extends a bolt 78 secured to the said arm 76. An arm 79, which extends at an angle to the arm 72 from the sleeve 79ª, is keyed, as indicated by the numeral 80, to the shaft 44. A spring 81 is secured, by means of the bolt 78, in engagement with the arm 76, which serves to yieldingly hold the arms 72 and 79 at an obtuse angle with respect to each other through the tension spring 81, which may be adjusted by means of a locking nut 82, which is threaded upon the free end of the bolt 78.

The shaft 44 is vertically movable through the switch stand, and is provided adjacent the lower end thereof, with a collar 83, which rests upon the slotted head 84 of a forwardly extending arm 85 formed upon the intermediate portion of a rod 86, journaled at its opposite ends in the sides of the rectangular extension 38. A downwardly slanting arm 87 is formed upon the rod 86, and extends through a slot 87ᵃ formed in the horizontal plate of the slide 64 to provide a means whereby when the said slide is moved longitudinally, the shaft 44 will be raised, which disengages the locking member 45 from the recess 49 and permits the said shaft to rotate. This shaft 44 is normally forced downward through the medium of a spring 88, which rests against the lower face of the plate 42 and the upper edge of a collar 89, adjustably secured to the shaft 44 by means of a set screw 90. Obviously the longitudinal movement of the slide 64 throws the switch points into engagement with the rails, and in order to lock these switch points in their proper position, a catch 91 which is in the form of a plate 92 is hinged, as indicated by the numeral 93, to the laterally extending end 94 of a vertical plate 95, which is bolted, riveted, or otherwise secured, to one end of the rectangular extension 38. The forward terminal of the plate 92 is provided with a depending tapered rib 96, which is adapted to engage the rear face of a tapered locking boss 97 formed upon the before-mentioned slide 64. In order to insure the downward movement of the catch 91, a leaf spring 98 is secured to the plate 95, and curved downwardly to engage the upper face of the plate 92, serving to force the same into a horizontal position.

A link 99 is pivoted to an upwardly extending lug 100 formed upon the upper face of the plate 92, adjacent the free end thereof, and is pivotally secured to a downwardly slanting arm 101 formed upon a rod 102, corresponding to the rod 86, and being journaled at its opposite ends in the sides of the housing 38. This rod 102 has a forwardly extending arm 103 formed thereon, which engages the upwardly extending forked end 104 of a rearwardly extending arm 105 formed at the lower pivoted terminal of a vertically extending operating lever 106, which projects through a slot 107 formed in the inwardly extending flange 39 of the housing 38. This lever is adapted to be locked by its engagement with the handle 108 of the lever 54, as clearly illustrated in Fig. 3 of the drawing. Obviously, when the lever 106 is moved upon its pivotal point to a position which raises the arm 105, the latch 91 will be raised, which releases the rib 96 from the tapered boss 97, and permits the slide 64 to be returned to its initial position.

A vertically extending rod 109 is journaled at its reduced opposite ends in the plate 37 and flange 39 respectively, and has formed thereon an arm 110, which is adapted to lie in the path of the arm 79 and limit the rotation of the shaft 44 in case a foreign object engages the switch points. This arm 110 is yieldingly held in the path of the arm 79 by means of a leaf spring 111, which is bolted, or otherwise secured, as indicated by the numeral 112, to one face of the arm 110, and lying in engagement with the inner face of one wall of the rectangular extension 38.

A laterally extending arm 113 projects from the lower extremity of the rod 109, and is pivotally connected to a link 114, which link in turn is connected at its opposite end to a swinging bar 115 carried by a vertical rod 116, mounted at its opposite reduced ends, as indicated by the numeral 117, to the forwardly extending arms 118 formed upon a vertical plate 119, bolted, or otherwise rigidly secured, to one wall of the housing 38. The opposite end of the swinging bar 115 is extended, as indicated by the numeral 120, above the upwardly extending flange of the slide 64, for engagement with a projection 121 formed thereon. The extremity 120 of the swinging bar 115 is arranged to engage the downwardly slanting arm 87 for operating and raising shaft 44. A depending extension 122 projects downwardly and rearwardly from the rod 102, and engages the upper forked end 123 of a vertical arm 124 formed upon the arm 113 adjacent its pivotal connection with the link 114.

The operation of the device is as follows: When it is desired to operate the switch by hand, the arm 54 is released from the lug 56 and the plate 50 rotated thereby until the said lever engages the opposite lug 56, to which it may be secured in retaining the switch in its locked position. The rotation of this plate 50 obviously rotates the shaft 44, which causes the switch points to be thrown through the medium of the rod 7 and link 8 connected to the crank arm 57, as previously described.

The device is automatically operated as follows: As the train advances toward the switch, the enlarged end 36 of the arm 35 obviously engages the operating member 20 lying in the path thereof, forcing the same, together with the member 22 downward against the tension of the springs 33 and 28, causing the rod 26 to be moved forwardly, operating the slide 64. As the slide 64 starts in its longitudinal movement through the switch stand, the rear edge of slot 71 coming in contact with the arm 72 causes the shaft 44 to be operated after being raised through the medium of the arms 85 and 87 and supporting rod 86, as will be clearly apparent from Fig. 2 of the drawings. As shown in Figs. 3 and 4, the arm 113 integral with shaft 109 and lying below the plane of 112 is in the position it assumes prior to the engagement of the arm 72 by the end of the slot 71, the relative position of which is shown in Fig. 2. The arm 79 is shown in Fig. 4 as about to engage arm 110 to dispose this arm to the position shown in Fig. 5, by which movement the arm 114 displaces the end 120 of the swinging bar 115 from the position shown in Fig. 4 to that shown in Fig. 5, the extension 124 of the arm 113 bearing against the extension 122 of the arm 102, actuating arms 101 and 99 to raise the rib 96, all of which is accomplished in the early part of the movement of slide 64 before the end of slot 71 has passed the rib 96. When the slide 64 has been fully thrown by the mechanism operated by the shoe on the engine and the arm 8 encounters an opposition caused by a foreign object lying between the switch points, the shaft 44 is prevented from revolving in its normal manner by the pressure of the foreign object. The arm 79 is thus prevented from engaging arm 110 for the reason that although it has risen to the plane of 110 by the action of arm 87, shaft 44 has not been permitted to complete its revolution because of the obstacle between the switch points and instead of passing this arm as normally provided, arm 110 remains in contact with it which supports the rib 96 holding it out of engagement with the locking boss 97 at the end of the movement of 64, thus subjecting 64 to the contraction of the springs 28 by which it is returned to its initial position before the engine reaches the switch, throwing the train to the main line instead of the siding. As the slide 64 is advanced through the switch stand, the tapered boss 97 is engaged by the rib 96 carried by the plate 92, which obviously locks the switch in its opened position. When it is desired to release the switch by hand, the lever 54 is disengaged from the offset upper terminal of the lever 106, which may be moved through the slot, obviously causing the latch 91 to be lifted through its connection therewith, as previously described. Should any undesired foreign object engage the switch points which would prevent their opening to the full extent, the slide 64 will be operated to its full extent, but as the arm 79 engages the arm 110, which obviously forces the same outward, causing the latch to be raised and retained in its raised position by the action of the vertical arm 124 and forked end 123 formed thereon, the switch points will be immediately returned to their closed position, when the arm 36 carried by the engine is moved from engagement with the operating members 20 and 22 of the trip mechanism.

From the foregoing disclosures, taken in connection with the accompanying drawings, it will be manifest that a switch of the nature described is provided which will fulfil all of the necessary requirements of such a device.

Having thus fully described this invention, what I claim as new and desire to secure by Letters Patent is:

1. A device of the character described comprising a switch stand, a shaft mounted therein, a crank arm formed upon the shaft, a link connecting the crank arm with the points of a switch, a plate carried by the switch stand and engaging the shaft, a lever secured to the plate for the purpose of rotating the same and throwing the switch points, and means slidable through said switch stand to rotate the shaft independently of said lever.

2. A device of the nature described comprising a switch stand, a slide movable through said switch stand, a shaft located within the switch stand, an arm carried by the switch stand and engaging the slide, a plate secured to the switch stand and provided with a recess, a locking member carried by the shaft and engaging the recess, for the purpose of preventing the rotation of the shaft, an arm journaled in the switch stand and engaging the shaft, and means connecting said arm with the slide, whereby the shaft will be raised and the locking member removed from the plate upon the operation of the slide.

3. A device of the nature described comprising a switch stand, a shaft mounted therein, a slide movable through said switch stand, a rod journaled in the switch stand, an arm extending from the rod and engaging the shaft, a plate carried by the switch stand, a locking member keyed to the shaft and engaging a recess formed in the plate, means for forcing the locking member into the recess, an arm extending from the rod and engaging the slide, a link connecting the shaft with the points of a switch, and means for operating the slide and throwing the switch.

4. A device of the nature described comprising a switch stand, a shaft mounted therein, a plate carried by the switch stand, a locking member keyed to the shaft and engaging the plate, for the purpose of preventing the rotation of the shaft, a rod journaled in the switch stand, an arm carried by the rod and engaging a collar secured to the shaft, a slide movable through the switch stand and provided with a slot, an arm extending from the shaft and engaging the slot, an arm extending from the rod and engaging a slot formed in the slide, whereby the shaft will be raised and the locking member removed from the seat upon the operation of the slide.

5. A device such as described consisting of a switch stand, a shaft mounted therein, a plate secured to the switch stand and provided with a seat, a locking member keyed to the shaft and engaging said seat, a spring adapted to force the locking member into engagement with the seat, a collar secured to the shaft, a rod journaled in the switch stand, an arm extending from the rod and engaging the collar, a slide movable through the switch stand, an arm extending from the rod and engaging the slide, an arm extending from the shaft and engaging a slot formed in the slide, whereby the shaft will be rotated and raised upon the movement of the slide, a latch located within the switch stand, a boss formed upon the slide for engagement with the latch, for the purpose of retaining the slide in one position, and a lever extending into the switch stand, whereby the latch may be raised and the slide released.

6. A device such as described consisting of a switch stand, a slide movable therethrough, said slide being provided with a pair of slots, a shaft journaled in the switch stand, means for locking the shaft against rotation, a rod journaled in the switch stand, an arm extending from the rod and engaging the shaft for the purpose of raising and lowering the same upon the rotation of the rod, an arm extending from the rod and engaging one of the slots formed in the slide to provide a means for rotating the rod upon movement of the slide, an arm carried by the shaft and extending through one of said slots formed in the slide, a latch pivoted to the switch stand, a boss formed upon the slide for engaging the latch, whereby said slide will be retained in one position, a shaft journaled in the switch stand, means for rotating the rod, and means operatively connecting the rod with the latch, whereby the said latch will be raised and the slide released upon the rotation of the rod.

7. A device of the nature described comprising a switch stand, a slide movable through said switch stand and provided with a pair of slots, a rod journaled in one side of the switch stand, an arm extending from said rod, a shaft journaled in the switch stand and extending through the arm, a second arm carried by the rod and extending through one of the slots formed in the slide, whereby the opposite arm will be raised upon movement of the slide and the shaft will be raised, an arm extending from the shaft and passing through one of the slots formed in the slide, a boss formed upon the slide, a latch adapted to engage said boss and retain the slide in one position, means for releasing the latch, a rod journaled in the switch stand, an arm extending from said rod, an arm secured to the arm carried by the shaft and adapted to lie in the path of the arm carried by the last-mentioned rod when the shaft is in raised position, and means for raising the arms for engagement, as and for the purposes set forth.

8. A device of the nature described comprising a switch stand, an operating shaft located therein, a link connecting the operating shaft with the points of a switch, an arm carried by the operating shaft, a slide extending through the switch stand and engaging the arm carried by the operating rod, a collar carried by the shaft, a locking member carried by the shaft, a plate carried by the switch stand and provided with a seat for the reception of the locking member, a spring engaging the shaft and adapted to force the locking member into engagement with the seat, a lifting rod journaled in the casing, an arm extending from the lifting rod and engaging the collar carried by the operating shaft, an arm extending from the lifting rod and engaging the slide, whereby, upon movement of the same, the shaft will be raised and the locking member removed from the seat formed in the plate, an arm yieldingly secured to the arm carried by the operating shaft, a vertical shaft journaled in the switch stand, an arm carried thereby and adapted to lie in the path of the arm yieldingly secured to the operating rod, a latch pivoted to the casing, a boss carried by the slide and adapted to engage the latch, means for manually raising the latch, and means carried by the vertical rod for moving the arm carried thereby out of engagement with the arm which is yieldingly secured to the operating rod.

9. A device of the nature described consisting of a switch stand, an operating rod journaled therein, a rotatable plate carried by the switch stand, means for rotating the plate and means for locking the same against rotation, a locking member carried by the operating rod and normally engaging a seat formed in the rotatable plate, a spring carried by the operating shaft and normally forcing the locking member into engagement with the seat, a collar carried by the operating shaft, a lifting rod journaled in the switch stand, an arm extending from the lifting rod and engaging the collar, a slide movable through the switch stand, an arm extending from the lifting rod and engaging the slide, providing a means whereby the shaft will be raised as the slide is operated, means for operating the slide, an arm secured to the shaft, an arm yieldingly carried by this last-mentioned arm and engaging the slide, whereby the shaft will be rotated upon the operation of the slide, a latch pivoted within the switch stand, a latch-releasing rod journaled within the switch stand, an arm extending therefrom and operatively connected to the latch, whereby the same will be raised as the latch-releasing rod is rotated, a boss formed upon the slide for engaging the latch, an arm extending from the latch-releasing rod, a lever engaging said arm, whereby the latch may be released, means for locking this lever against movement, a vertical rod journaled in the switch stand, an arm extending therefrom and lying in the path of the arm carried by the operating shaft when said shaft is lifted, an arm extending from the vertical shaft below the first-mentioned arm carried thereby, a forked member formed thereon, an arm carried by the latch-releasing rod for engagement with the forked member, a link secured to the lower arm carried by the vertical shaft, a shaft journaled in a bracket secured in the switch stand, a swinging member extending from the shaft and connected to the link, one end of said swinging member lying in the path of the arm which extends from the lifting rod and engages the slide, and means for operating the slide, substantially as and for the purpose set forth.

In testimony whereof I affix my signature in presence of two witnesses.

ROBERT FAY.

Witnesses:
RILEY CRAIN,
HUGH FAY.

Copies of this patent may be obtained for five cents each, by addressing the "Commissioner of Patents, Washington, D. C."